2,741,332
Patented Apr. 10, 1956

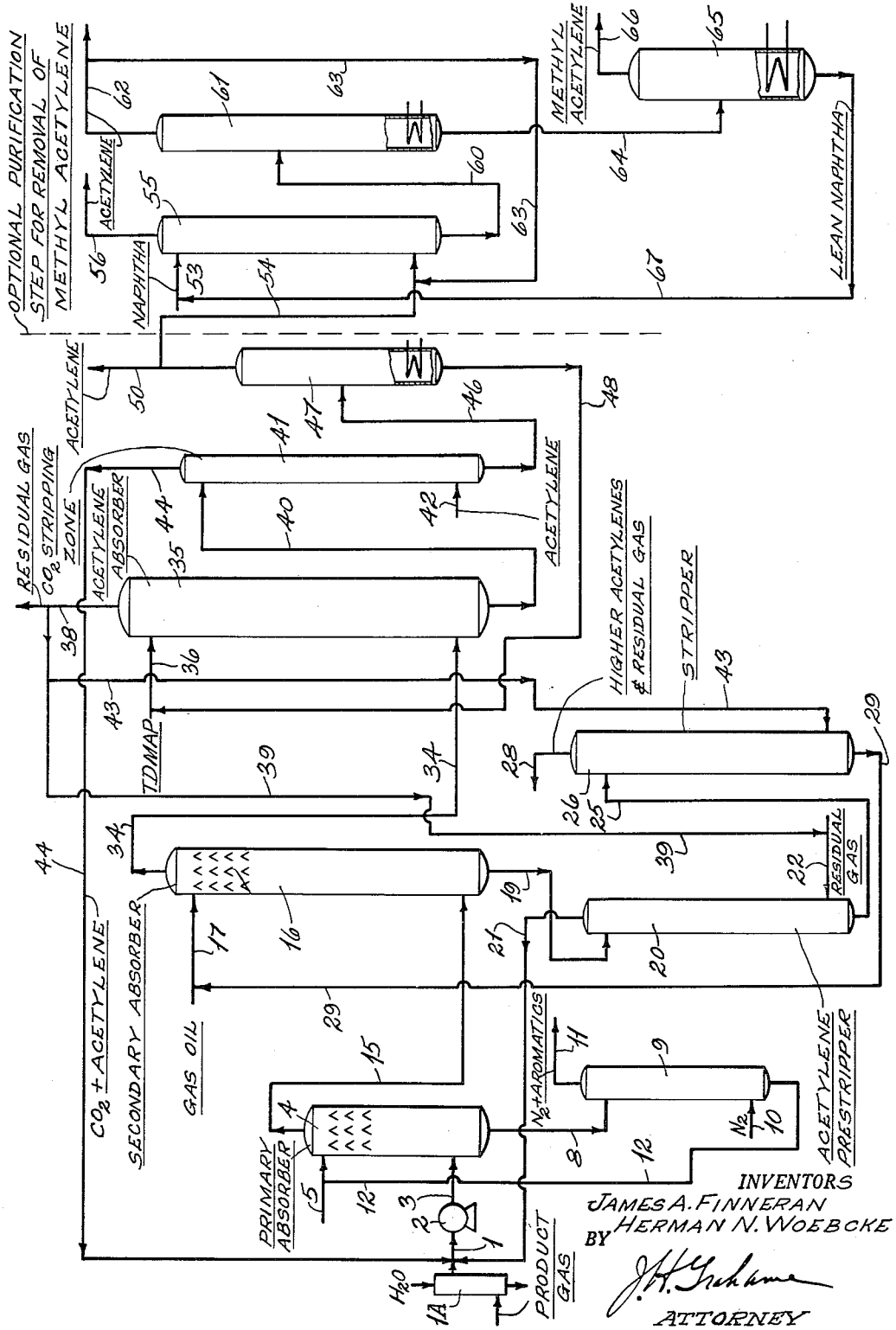

2,741,332

PROCESS FOR RECOVERING ACETYLENE

James A. Finneran, Westbury, N. Y., and Herman N. Woebcke, Emerson, N. J., assignors to Hydrocarbon Research, Inc., New York, N. Y., a corporation of New Jersey Application February 29, 1952, Serial No. 274,188

12 Claims. (Cl. 183—115)

This invention relates to the isolation and purification of acetylene present in low concentration in gaseous streams which are produced by acetylene manufacturing processes employing a hydrocarbon as a charge material. The process of the invention is particularly applicable to the recovery of acetylene in a highly purified state from the gaseous product mixture obtained by short contact time—incomplete combustion of a hydrocarbon.

The classic method of preparing acetylene which involves the reaction of water with calcium carbide has recently been challenged by newer processes for producing acetylene which are based on natural gas as a charge material. The activity in the acetylene field has been enormously stimulated by Reppe's developments in the field of acetylene chemistry and by the rapid development of acrylonitrile polymers as wool substitutes. The processes for producing acetylene from gaseous hydrocarbons include the Schoch process which involves subjecting natural gas to electric discharge, the so-called Sachse process which involves partial oxidation of methane with oxygen at elevated temperature and short contact time, and the Wulff process which produces acetylene by thermally cracking a hydrocarbon in a regenerative furnace. All of these processes yield a gaseous product stream in which the acetylene is a minor constituent, usually less than 10% by volume of the product stream. It is apparent that one of the most important requirements for raising these new acetylene processes to commercial status is the development of an efficient recovery and purification system.

The present invention provides an answer to the need for an efficient, foolproof system for recovering acetylene in a high degree of purity from the dilute streams produced by decomposition of a hydrocarbon. The process of this invention generally results in recovery of acetylene from the gaseous product stream in better than 98% by volume purity. In addition, the present invention minimizes the hazards of acetylene recovery and is the safest and most efficient means yet devised for the separation of acetylene from dilute gaseous streams.

In accordance with the process of this invention, acetylene is recovered in high purity from a gaseous stream, which contains acetylene in low concentration and which is produced by decomposition of a hydrocarbon, by a series of steps including two absorption steps for separate removal from the gaseous stream of tars, aromatic hydrocarbons, phenyl acetylene and triacetylene in the first absorber and the remaining higher acetylenes, particularly vinyl acetylene and diacetylene in the second absorber, and a third absorption step for acetylene recovery from the residual gas. In the primary absorption tower the product gas stream is contacted at a temperature of 30 to 100° F. and at a pressure of approximately atmospheric to 150 p. s. i. g. with a small proportion of a highly paraffinic gas oil. The gas stream, after flow through the first absorber, is contacted in a secondary absorption tower with a larger proportion of paraffinic gas oil at a pressure of approximately atmospheric to 150 p. s. i. g. and at a similar temperature of 30 to 100° F. The gas stream derived from the secondary absorption step is then contacted with a selective solvent for acetylene, for example, tris-dimethylamido phosphate (TDMAP) or dimethyl formamide (DMF). The selective solvent removes substantially all of the acetylene from the gas stream and also removes a portion of the carbon dioxide present in the product gas. The carbon dioxide is removed from the rich solvent by prestripping with acetylene to yield an overhead gas comprising carbon dioxide and acetylene which overhead gas is compressed and recycled to the primary absorption tower. The acetylene is finally stripped from the rich solvent by increasing the temperature or by decreasing the pressure.

It has been discovered that a one-step absorption of tars, aromatic hydrocarbons and higher acetylenes as practiced prior to this invention is extremely hazardous and causes operating difficulties in the nature of sludges, deposits and plugs formed in the recovery unit, particularly in the exchangers. Apparently, highly explosive compounds are formed by reactions of aromatics and higher acetylenes such as vinyl acetylene and diacetylene when all the by-products are removed from the acetylene-containing product stream in a single absorption stage. The success of the process of this invention appears to stem from conducting the first absorption under controlled conditions so that 90% or more of the tars and aromatic hydrocarbons in the gaseous stream are removed therefrom with minimum absorption of vinyl acetylene and diacetylene which are primarily removed in the second absorption. It is believed fortunate and a contributing factor to the success of this process that when the first absorber is controlled to remove 90% or more of the aromatic hydrocarbons in the gas stream, more than 90% of the phenyl acetylene and triacetylene in the gas stream will also be removed. The operating conditions required to effect such stage-wise removal of by-products are important features of this invention.

To achieve the desired stagewise removal of by-products, the gaseous stream is contacted with highly paraffinic gas oil, desirably having a boiling point range of 400 to 500° F., in the first absorber in the proportion of 1 gallon per 30 to 60 cubic feet of gas passing therethrough (the gas volume being measured at the conditions existing in the absorber), preferably 1 gallon per 40 to 50 cubic feet. The rich absorber oil is stripped of absorbed by-products either by heating or by reducing the pressure on the oil; a stripping gas, such as nitrogen or a mixture of hydrogen and carbon monoxide, is usually employed to facilitate stripping.

After passing through the first absorber, the gaseous stream contacts highly paraffinic gas oil in the second absorber in the proportion of 1 gallon per 3 to 6 cubic feet of gas passing therethrough (the gas volume being measured at the conditions existing in the absorber), preferably 1 gallon per 4 to 5 cubic feet.

Since approximately 5 to 7% of the acetylene is removed from the product stream in the secondary absorber, it is necessary to prestrip the rich oil from the secondary absorber. Accordingly, a portion of the residue gas comprising mainly carbon monoxide and hydrogen is contacted with the rich oil at atmospheric pressure and at a temperature of 35 to 100° F. Substantially all of the acetylene absorbed in the secondary absorber is removed from the rich absorber oil by this treatment and is recycled to the primary absorber. After acetylene removal by prestripping, higher acetylenes, principally vinyl acetylene and diacetylene, are removed from the rich oil either by bubbling a stripping gas such as residue gas or nitrogen therethrough at atmospheric pressure and a temperature of approximately 100° F. or by treatment with the same gases at a lower temperature and at reduced pressure.

After the primary and secondary absorption steps, the product gas is substantially free of benzene, higher aromatics and higher acetylenes and comprises acetylene, hydrogen, carbon monoxide, carbon dioxide and a small amount of methyl acetylene. Removal of acetylene from this product stream is effected by contact with a selective solvent such as DMF, TDMAP or butyrolactone. The selective solvent is chosen on the basis of high solubility for acetylene and limited solubility for carbon dioxide. The absorption of acetylene is generally conducted at a temperature in the range of about 30 to 100° F. and at a pressure from about atmospheric to 150 p. s. i. g. Approximately 1 gallon of TDMAP is made to flow through the third absorber for every 5 to 10 cubic feet of gas passing therethrough (the gas volume being measured at the conditions existing in the absorber). The flow rate for DMF is approximately 1 gallon for every 3 to 7 cubic feet of gas.

Approximately 99% of the acetylene present in the product gas is removed in the third absorber. Approximately 7% of the carbon dioxide present in the product gas is also absorbed. Accordingly, prior to recovery of acetylene from the rich solvent, the rich solvent is prestripped with acetylene to remove carbon dioxide. The overhead gas from the stripping operation is recycled to the first absorber for reprocessing in accordance with this invention. The prestripping of the rich solvent may be effected at a temperature of the order of 165° F. and at atmospheric pressure. Recovery of acetylene from the rich solvent after carbon dioxide prestripping, is effected by further increasing the temperature and decreasing the pressure. The selective solvent is then cooled and recirculated to the third absorption tower.

The acetylene recovered by the process of the invention contains less than 0.4 mol percent of methyl acetylene. While acetylene of this purity is often acceptable, it is sometimes desirable to produce acetylene containing less than 0.15 mol percent of methyl acetylene. In such event, the recovered acetylene may be subjected to a purification step involving contact with light naphtha. The acetylene is scrubbed with light naphtha at atmospheric pressure and at a temperature of about 30 to 60° F. whereby the methyl acetylene is preferentially removed from the product acetylene. Since contact with light naphtha also absorbs a substantial percentage of acetylene, it is advisable to subject the rich naphtha to a prestripping operation which merely involves reboiling the rich naphtha at a temperature of about 200° F. and atmospheric pressure in order to drive off the acetylene. Thereafter, the rich naphtha is stripped of methyl acetylene.

The process of the invention will be illustrated by the isolation and recovery of high purity acetylene from the product stream obtained by partial combustion of natural gas with oxygen at a temperature between about 2500 and 3000° F., desirably at about 2800° F., at atmospheric pressure, and at a contact time of about 0.001 to 0.1 second, preferably less than about 0.01 second. The typical product stream produced by the partial combustion of methane at the aforesaid conditions contains on a volume basis approximately 8% acetylene, 0.2% benzene and higher boiling aromatics, 0.1% phenyl acetylene and triacetylene, 0.4% diacetylene, 0.1% vinyl acetylene, 0.2% methyl acetylene, 4% carbon dioxide and the remainder comprising principally hydrogen and carbon monoxide with minor amounts of nitrogen and methane; the aforesaid remainder comprises approximately 75 to 85% hydrogen and carbon monoxide in approximately a 2:1 mol ratio.

Referring to the accompanying drawing which is one diagrammatic flowsheet of the process of this invention, the gaseous product stream obtained by the partial combustion of natural gas with high-purity oxygen is passed through a water scrubber 1A wherein the gaseous stream is scrubbed with water to remove entrained carbon particles, tar mist and water-soluble compounds. While the water-scrubbing step is of value in connection with any gaseous stream to be processed in accordance with this invention because such stream usually carries in suspension carbon particles, tar mist and dust particles which can be washed from the gaseous stream, water-scrubbing is particularly important for any gaseous stream produced by the partial oxidation of a hydrocarbon as is the case in the illustrative example of the appended flowsheet. In such instance, the gaseous stream appears to have small quantities of hydrocyanic acid, nitrogen oxides and oxygenated hydrocarbons that are formed during the high-temperature partial combustion step for the production of acetylene. The removal of these impurities is beneficial to the subsequent absorption steps since they would otherwise tend to react or catalyze reactions and/or cause foaming in the absorber liquid.

The washed gas flows through pipe 1 into compressor 2, which preferably contains two stages and is provided with means for pre-, inter-, and after-cooling. The gaseous stream leaves the compressor at approximately 30 p. s. i. g. through pipe 3 and is introduced into primary absorber 4, maintained under refrigeration at a temperature of about 45° F., wherein the stream is contacted with a highly paraffinic gas oil in the proportion of 1 gallon per 45 cubic feet of gas. The gas oil is introduced into the absorber through pipe 5. At the prescribed conditions, at least 95% of the benzene and higher aromatics are removed from the gaseous stream along with substantially all phenyl acetylene and triacetylene but with no substantial absorption of other acetylenes.

The rich absorber oil is withdrawn from absorber 4 through pipe 8, and is introduced into stripper 9 wherein the absorbed materials are removed from the absorber oil by stripping with nitrogen at a temperature of about 80° F. The nitrogen is introduced into stripping tower 9 through pipe 10. Nitrogen and stripped materials are removed from the upper portion of tower 9 through pipe 11. The lean oil is returned to primary absorber 4 through pipes 12 and 5.

The gaseous stream substantially free of benzene and aromatics passes from primary absorber 4 through pipe 15 to secondary absorber 16 wherein it is contacted at a temperature of 45° F. and at a pressure of 28 p. s. i. g. with one gallon of highly paraffinic gas oil per 4 cubic feet of gas. The gas oil is introduced into the upper part of absorber tower 16 through pipe 17. Contact of the gaseous stream with gas oil under the prescribed conditions effects removal of at least 95% of the higher acetylenes, particularly vinyl acetylene and diacetylene, and absorption of about 6% of the total acetylene present in the stream.

The absorption of some of the acetylene necessitates prestripping the rich absorber oil for recovery of acetylene. Accordingly, the rich absorber oil is withdrawn from the bottom of tower 16 through pipe 19 and introduced into an acetylene prestripper 20 wherein it is contacted at atmospheric pressure and at a temperature of 45° F. with inert residual gas (hereinbelow identified) introduced through pipe 22. The acetylene-containing gas is removed from prestripper 20 through pipe 21 and recycled to compressor 2 and thence to primary absorber 4.

The rich absorber oil from which acetylene has been stripped is withdrawn from prestripper 20 through pipe 25 and introduced into stripper 26 wherein absorbed higher acetylenes are removed from the absorber oil by contact at atmospheric pressure and a temperature of 100° F. with inert residual gas introduced through pipe 43. The higher acetylenes are removed overhead from tower 26 with the residual gas leaving through pipe 28. The stripper 26 may also be operated at a reduced pressure of about 2 p. s. i. a. and at a temperature of 45° F. The lean absorber oil is withdrawn from stripper 26 through pipe 29 and recycled to secondary absorber 16.

The acetylene-containing gaseous stream, freed of its content of aromatics and higher acetylenes, is withdrawn from secondary absorber 16 through pipe 34 and introduced into absorber 35 wherein it is contacted with TDMAP at a pressure of 25 p. s. i. g. and a temperature of about 40° F. The heat of solution causes the temperature to rise considerably in tower 35, but precautions are taken so that the temperature does not rise above approximately 80° F. TDMAP is introduced into the upper portion of tower 35 through pipe 36 in the proportion of one gallon per 8 cubic feet of gas. More than 99% by volume of the acetylene in the gaseous stream is absorbed therefrom by this treatment so that there is obtained a residual gas containing less than 0.1% by volume of acetylene. This residual gas comprises mainly carbon monoxide and hydrogen with minor quantities of carbon dioxide and methane and thus is a valuable fuel gas or reactant gas for the synthesis of hydrocarbons, ammonia and other chemicals. A portion of the residual gas is removed from tower 35 through pipe 38 for such utilization, while the remainder is passed through lines 39 and 43 to serve as the stripping gas in prestripper 20 and stripper 26, respectively.

Since TDMAP also absorbs some carbon dioxide from the gaseous stream, it is necessary to subject the rich solvent to carbon dioxide stripping prior to recovery of acetylene therefrom. To this end, the rich solvent is withdrawn from tower 35 through pipe 40 and introduced into stripping zone 41 wherein it is contacted with product acetylene at 1 p. s. i. g. pressure and a temperature of 165° F. The carbon dioxide stripping requires approximately 3 cubic feet of acetylene per gallon of solvent; the acetylene is introduced into stripping tower 41 through pipe 42. The mixture of stripped carbon dioxide and acetylene stripping gas is removed overhead from tower 41 through pipe 44 and recycled therethrough to compressor 2.

The rich solvent, after removal of carbon dioxide, is withdrawn from stripper 41 through pipe 46 and introduced into stripper 47 wherein acetylene is stripped out at a temperature of approximately 200° F. and at a reduced pressure of 2 p. s. i. a. Lean TDMAP is withdrawn from stripper 47 through pipe 48 and recycled to tower 35.

The acetylene withdrawn from the stripper 47 through pipe 50 is of high purity as indicated by the following approximate composition: 98.6 mol per cent acetylene, 0.8 mol per cent carbon dioxide, 0.5 mol per cent methyl acetylene and 0.06 mol per cent higher acetylenes. Acetylene of this purity meets the usual purity requirements for acetylene. However, the methyl acetylene content can be further reduced by a purification step involving scrubbing with naphtha. The methyl acetylene removal step is also shown on the attached drawing.

Reduction of the methyl acetylene content to less than 0.15 mol per cent is effected by passing the acetylene obtained from stripper 47 through pipe 54 into absorber 55. In absorber 55 the acetylene contacts light naphtha introduced through pipe 53 at atmospheric pressure, a temperature of 40 to 60° F. and in a proportion of one gallon of naphtha for 2 to 3 cubic feet of acetylene. Methyl acetylene is removed from the high purity acetylene by this treatment. There is obtained from the upper portion of absorption tower 55 through pipe 56 acetylene which contains less than 0.15 mol per cent methyl acetylene.

Since approximately 45% of the acetylene stream is absorbed in the light naphtha in tower 55, it is necessary to strip acetylene therefrom. This is effected by passing the rich naphtha from absorber 55 through pipe 60 into prestripper 61 wherein acetylene is stripped from the rich naphtha at a temperature of 160 to 210° F. and at a pressure of 2 p. s. i. a. The recovered acetylene is removed from prestripper 61 through pipe 62 and is usually recycled to absorber 55 through pipe 63.

After removal of acetylene, the naphtha is introduced into stripper 65 through pipe 64 wherein it is freed of methyl acetylene at atmospheric pressure and a temperature of 200 to 220° F. Methyl acetylene is taken off overhead from stripper 65 through pipe 66. Lean naphtha is withdrawn from the bottom of stripper 65 through pipe 67 and recycled to absorber 55.

The acetylene recovered from the naphtha purification step is of extremely high purity as indicated by its composition of 98.9 mol per cent acetylene, 0.9 mol per cent carbon dioxide, 0.13 mol per cent methyl acetylene, 0.05 mol per cent vinyl acetylene and 0.015 mol per cent other acetylenes.

It is well to note that when DMF is used in place of TDMAP as the selective solvent for acetylene, the optional purification system comprising towers 55, 61 and 65 for removing small amounts of methyl acetylene from acetylene becomes unnecessary. In such event, part of the DMF flowing from tower 47 through line 48 to tower 35 may be bypassed through an additional tower to strip methyl acetylene from the DMF stream; the DMF stream thus stripped of methyl acetylene would then be re-introduced at the topmost plate in tower 47. Acetylene containing less than 0.15 mol per cent of methyl acetylene can be recovered by such operation with DMF.

Obviously, many modifications and variations of the invention, as hereinbefore set forth, may be made without departing from the spirit and scope thereof and, therefore, only such limitations should be imposed as are indicated in the appended claims.

What is claimed is:

1. A process for recovering acetylene in pure form from a gas stream containing acetylene in low concentration and produced by the high-temperature decomposition of a hydrocarbon, which comprises contacting said gas stream in a primary absorption zone at a pressure in the range of about atmospheric to 150 p. s. i. g. with a highly paraffinic oil at a temperature between about 30 and 100° F. and in a proportion just sufficient to absorb substantially all aromatic hydrocarbons and only a minor portion of vinyl acetylene and diacetylene in said gas stream, thereafter subjecting said gas stream in a secondary absorption zone at a pressure in the range of about atmospheric to 150 p. s. i. g. to further contact with a highly paraffinic oil at a temperature between about 30 and 100° F. and in a proportion just sufficient to absorb substantially all vinyl acetylene and diacetylene remaining in said gas stream, thereafter contacting said gas stream at a pressure in the range of about atmospheric to 150 p. s. i. g. with a selective solvent for acetylene at a temperature between about 30 and 100° F., and recovering absorbed acetylene from said selective solvent.

2. A process according to claim 1 wherein the proportion of paraffinic oil used in the primary absorption zone is approximately 1 gallon for every 30 to 60 cubic feet of gas contacting said oil.

3. A process according to claim 2 wherein the proportion of paraffinic oil used in the secondary absorption zone is approximately 1 gallon for every 3 to 6 cubic feet of gas contacting said oil.

4. A process according to claim 1 wherein the gas stream containing acetylene is produced by the partial combustion of a gaseous hydrocarbon with high-purity oxygen and said gas stream is washed with water prior to contact with the highly paraffinic oil in the first absorption zone.

5. A process according to claim 1 wherein the selective solvent is dimethyl formamide.

6. A process according to claim 1 wherein the selective solvent is tris-dimethylamido phosphate.

7. A process according to claim 6 wherein the proportion of selective solvent contacting the gas stream is approximately 1 gallon for every 5 to 10 cubic feet of gas.

8. A process according to claim 7 wherein absorbed acetylene recovered from the selective solvent is scrubbed with naphtha to remove methyl acetylene therefrom.

9. In the process for recovering acetylene in pure form from a gaseous stream containing in low concentration acetylene, aromatic hydrocarbons, vinyl acetylene and diacetylene wherein said aromatic hydrocarbons, vinyl acetylene and diacetylene are removed from said gaseous stream by absorption in a highly paraffinic oil prior to the isolation of said acetylene from said gaseous stream by absorption in a selective solvent for acetylene, the improvement which comprises conducting the absorption with said oil in two stages under controlled conditions to remove from said gaseous stream at least 90% of said aromatic hydrocarbons without substantial absorption of said vinyl acetylene and diacetylene in the first stage and to remove from said gaseous stream substantially all of said vinyl acetylene and diacetylene without substantial absorption of said acetylene in the second stage.

10. The process of claim 9 wherein the absorption is conducted in the first and second stages at temperatures in the range of about 30 to 100° F. and at pressures in the range of about atmospheric pressure to 150 p. s. i. g.

11. The process of claim 9 wherein the proportion of highly paraffinic oil brought into contact with the gaseous stream in the first absorption stage is of the order of one-tenth of the proportion of said oil brought into contact with said gaseous stream in the second absorption stage.

12. The process of claim 11 wherein the proportion of highly paraffinic oil brought into contact with the gaseous stream in the first absorption stage is approximately 1 gallon for every 40 to 50 cubic feet of gas.

References Cited in the file of this patent

UNITED STATES PATENTS

| | | |
|---|---|---|
| 1,988,032 | Baumann et al. | Jan. 15, 1935 |
| 2,146,448 | Scott et al. | Feb. 7, 1939 |
| 2,158,582 | Isham et al. | May 16, 1939 |
| 2,183,148 | Murphree | Dec. 12, 1939 |
| 2,238,490 | Hasche | Apr. 15, 1941 |
| 2,502,966 | Kosolapoff | Apr. 4, 1950 |
| 2,623,611 | Levine et al. | Dec. 30, 1952 |